United States Patent Office 3,548,060
Patented Dec. 15, 1970

3,548,060
PHOTOTROPIC GLASS AND METHOD
Joji Suzuki, Itami-shi, and Makoto Kume, Takarazuka-shi, Japan, assignors to Nippon Sheet Glass Co., Ltd., Doshomachi, Higashi-ku, Osaka, Japan
No Drawing. Filed Jan. 3, 1967, Ser. No. 606,530
Claims priority, application Japan, Jan. 13, 1966, 41/1,557
Int. Cl. C03c 3/14, 3/22, 3/26
U.S. Cl. 106—47                                    4 Claims

ABSTRACT OF THE DISCLOSURE

A phototropic glass comprising a borate glass body comprising 30–86 percent by weight $B_2O_3$, 2–35% $Al_2O_3$ and 12–45% of at least one alkaline earth oxide and containing therein microcrystals of silver chloride or silver bromide, and copper oxide, and method of producing the phototropic glass which comprises melting a batch for the said glass body, forming and cooling the molten glass, heat treating said glass to cause the silver halide to crystallize, and cooling the glass.

---

This invention relates to a new phototropic glass and in particular to a transparent phototropic glass which is promptly darkened by exposure to ultraviolet or visible radiation of short wavelength but is promptly returned to its former state upon termination of the exposure.

Phototropic glasses are characterized in that their optical transmittance varies reversibly with the intensity of actinic radiation incident thereon. Such glasses have a wide variety of applications. When used for ophthalmic lenses or glass for building and automotive purposes, it is required that it be one which not only is prompt in its coloring and decoloring action but is also transparent. When a glass of this type is used for eyeglasses, the glass darkens promptly upon exposure to intense light and protects the eyes, and upon decrease of the light intensity is promptly decolored to permit visibility equal to that of the naked eye. It is also very convenient in the case of windowpanes, since the glass colors or decolors by promptly responding to the changes in intensity of sunlight incident thereon.

It has been known that phototropic glass can be obtained by incorporating a small amount of silver halides in the glass body in their microcrystalline form. The most typical is that disclosed in U.S. Pat. 3,208,860 and British patent specification No. 950,906, which uses a silicate glass for the body, and this requires a certain length of time for the coloration and decoloration of the glass.

An object of this invention is to provide a phototropic glass which is transparent and moreover in which the coloration and decoloration of the glass takes place promptly. Another object is to provide a method of manufacturing such a phtotropic glass.

A phototropic glass of this invention comprises a borate glass body containing therein microcrystals of at least one silver halide selected from the group consisting of silver chloride and silver bromide; and copper oxide, said borate glass body comprising 30–86% by weight of $B_2O_3$, 2–35% by weight of $Al_2O_3$ and 12–45% by weight of at least one alkaline earth metal oxide selected from the group consisting of CaO, SrO and BaO, each percentage being on an analysed basis, the concentration of said silver halide being at least 0.05% by weight, calculated as silver, of said borate glass body, and the concentration of said copper oxide, computed as CuO, being at least 0.005% by weight of said borate glass body.

The aforesaid phototropic glass according to this invention possesses many properties which are desirably possessed by such a glass. The following are some of its important features:

(a) The reversibility of coloration and recovery of the invention phototropic glass to actinic radiation is prompt. That is to say, the invention phototropic glass, which uses borate glass as its body, requires about 20–30 seconds for the saturation of coloring of the blass and about 5–30 seconds for recovering its optical density to half of the saturation value, both times being very prompt.

(b) The invention phototropic glass is completely colorless or, at most, tinged with a very light yellow color which is almost colorless. This glass moreover is very transparent.

(c) The phototropic glass of this invention is comparatively chemically stable. Prior to this invention, we made a phototropic glass comprising a $B_2O_3$-$Li_2O$ glass body containing microcrystals of AgBr, but this glass, while prompt in its reversibility of coloration and recovery, was not satisfactory as regards its transparency and chemical durability.

The demonstration of these excellent properties is believed to be due to a synergistic action of the several constituents of the invention phototropic glass. A description of each of the constituents and the amounts thereof in which they are to be contained will be set forth below.

The promptitude of the reversibility of coloration and recovery of the phototropic glass of this invention is achieved by using the prescribed borate glass as the body. The proportions in which the components $B_2O_3$, $Al_2O_3$ and alkaline earth metal oxide are contained must be held within the hereinbefore prescribed ranges. If departures are made from these ranges, there is a tendency to devitrification which makes it impossible to form a transparent glass. The scope of most preferable amounts is 60–80 wt. percent of $B_2O_3$, 7–20 wt. percent of $Al_2O_3$ and 12–25 wt. percent of an alkaline earth metal oxide. As the alkaline earth metal oxide, CaO, SrO and BaO can be used either singly or in a combination of two or more thereof. CaO is most preferable, next SrO is preferably used.

The microcrystals of the silver halide and the copper oxide constituents are mainly responsible for the phototropic property. The photosensitivity is not manifested if the silver halide alone is used, the photosensitivity being only imparted upon the copresence of a minute quantity of the copper oxide. As the silver halide, AgCl and AgBr are used, which may be used either singly or conjointly. AgI is not used however, because it is far inferior as to its decoloring property, though it has photosensivity. The amount present of the silver halide must be at least 0.05 weight percent, calculated as silver. If less than this value, the dark density attainable is too small for it to be serviceable. The dark density attained increases nearly proportionally as the amount present of the silver halide increases up to about 1.7 wt. percent, calculated as silver, but if it exceeds 1.7 wt. percent, the dark density becomes almost constant. Hence, the presence of the silver in an amount exceeding about 1.7 wt. percent is not economical. The copper oxide effectively functions with a minute quantity of such as 0.005 weight percent or more, computed as CuO. No special advantage is had in using it in excess of 0.03 wt. percent, since the results obtained are no different.

The invention phototropic glass can contain besides the aforesaid requisite constitutents, one or more of such constituents as $Li_2O$, $Na_2O$, $K_2O$, PbO and ZnO, as other consitituents. The total content of these constituents however must be not more than 25% based on the total weight of the phototropic glass. If the content of these constituents exceeds 25 wt. percent, the properties of the intended phototropic glass is deteriorated to an extreme degree.

The method of producing the phototropic glass of this invention comprises the steps of melting a batch for a borate glass body comprising 30–86% by weight of $B_2O_3$, 2–35% by weight of $Al_2O_3$ and 12–45% by weight of at least one alkaline earth metal oxide selected from the group consisting of CaO, SrO and BaO, each weight percentage being on an analyzed basis, said borate glass body containing a constituent of at least one silver halide selected from the group consisting of AgCl and AgBr, and a constituent of copper oxide, respectively in an amount of at least 0.05 wt. percent of said silver halide, calculated as silver, and at least 0.005 wt. percent of said copper oxide, computed as CuO, on the basis of said borate glass body, forming and cooling the molten glass, followed by heat treating said glass at a temperature of 550–750° C. for a time sufficient to cause said silver halide to crystallize and thereafter cooling the glass.

In the hereinabove described method of producing the phototropic glass of this invention, the starting materials necessary for preparing the batch for the glass body do not differ at all from those which are used in making the conventional borate glass. For example, boric acid, aluminum hydroxide and alkaline earth metal carbonates can be used, which are converted to their respective oxides in the melting step. On the other hand, as regards the silver bromide or chloride, it is possible to use together, for example, a silver salt such as silver nitrate and an alkali halide such as sodium- or potassium bromide or chloride as the starting materials, and to form the silver bromide or chloride as a result of the reaction of the silver salt and the alkali halide in the melting step. During the melting process of glass, because loss of an alkali halide is larger than that of a silver salt by volatilization, it is recommended to use the alkali halide in an amount in excess of its equivalent. The melting conditions are also those customarily used, the melting being carried out by heating the starting materials for a period of one half to one hour at a temperature of 1100 to 1350° C. in an air or oxidizing atmosphere. Temperature or times above or below these limits are undesirable, since in the case they are below the lower limits, bubbles tend to remain in the resulting molten glass, whereas in the case they are at above the upper limits the amount volatilized of the boric oxide and the halogen components becomes great.

The molten glass obtained in this manner is formed into a suitable shape and cooled. The so obtained glass must be then heat treated at 550–750° C. A part of the silver halide contained in the glass is formed into very minute crystals by this heat treatment, in consequence of which the glass is imparted photosensitivity. At below 550° C. the photosensitivity is not induced, while at above 750° C. the transparency of the glass is impaired. The period of time suitable for the heat treatment is from one half to three hours. Upon cooling the glass after its heat treatment, the invention phototropic glass having various excellent properties is provided.

The following nonlimitation examples are given to illustrate the method of producing the phototropic glass of this invention and to explain its property of reversibly responding to light.

EXAMPLE 1

A material batch consisting of 70 grams of boric acid anhydride, 23 grams of aluminum hydroxide, 26.8 grams of calcium carbonate, 0.9 gram of silver nitrate, 1.9 grams of potassium bromide and 0.01 gram of cuprous oxide were charged to a crucible. This was placed in a furnace and heated for 40 minutes at 1200° C. under an atmosphere of air to melt the batch. The several batch constituents correspond to contents in the borate glass body to be formed, on a weight basis, of 69% $B_2O_3$, 15% $Al_2O_3$, 15% CaO and 0.8% $K_2O$; and based on this body, of 0.5% Ag, 1.27% Br and 0.01% CuO. The crucible was then removed from furnace, and the molten glass was flowed onto a stainless steel plate to form it into a sheet, which was then allowed to stand and solidify. After this sheet was heat treated at 670° C. for 2 hours in a furnace, it was allowed to cool. The so obtained glass was transparent and practically colorless under exclusion of light. This glass was submitted to a light exposure test with the results shown in Table I, below, under glass 1. In Table I are set forth the results obtained with the glass produced in each example, the values shown being the determinations made as to the state of coloration and decoloration of the respective glasses at the elapsed times indicated after starting the exposure and after termination of the exposure when exposed to light from a xenon lamp for 30 seconds. The values in the table were obtained in the following manner. Each of the glass specimens was measured for its transmittance before and after the exposure. The optical density was computed from the transmittance, and the difference in the optical densities before and after the exposure were obtained. Letting 100 be the optical density at the time of the maximum coloration, the optical densities at the aforesaid elapsed times were expressed as percentages of the optical density at the time of maximum coloration. It can be seen from these results that the phototropic glass of this invention possesses in all instances a very prompt reversibility as to coloration and recovery.

EXAMPLE 2

A material batch consisting of 70 grams of boric acid anhydride, 30.6 grams of aluminum hydroxide, 26.4 grams of strontium carbonate, 0.72 gram of silver nitrate, 0.63 gram of potassium bromide and 0.01 gram of cuprous oxide was melted as in Example 1 except that the temperature and time used were 1100° C. and 30 minutes, respectively. The glass formed was heat treated for 30 minutes at 725° C. The several constituents of the batch correspond to contents in the borate glass body, on a weight basis, of 62% $B_2O_3$, 13% $Al_2O_3$, 25% SrO and 0.3% $K_2O$; and based on this body, of 0.46% Ag, 0.42% Br and 0.01% CuO. The so obtained glass was transparent and practically colorless under exclusion of light. The results of a light exposure test of this glass are shown in Table I under glass 2.

EXAMPLE 3

A material batch consisting of 70 grams of boric acid anhydride, 7.6 grams of aluminum hydroxide, 44.6 grams of calcium carbonate, 0.72 gram of silver nitrate, 2.4 grams of sodium chloride and 0.01 gram of cuprous oxide was melted as in Example 1, the temperature and time used being however 1100° C. and 30 minutes, respectively. After formation of the glass, it was heat treated for 30 minutes at 700° C. The several batch constituents correspond to contents in the resulting borate glass body, on weight basis, of 69% $B_2O_3$, 5% $Al_2O_3$, 25% CaO and 1.27% $Na_2O$; and based on this body, of 0.46% Ag, 1.46% Cl and 0.01% CuO. The so obtained glass was transparent and practically colorless under exclusion of light.

The results of a light exposure test of this glass are shown in Table I under glass 3.

TABLE 1

[The state of coloration and decoloration of the respective glasses at the elapsed times indicated after starting the exposure and after termination of the exposure]

| Time | Time elapsed after start of exposure (sec.) | | | | | Time elapsed after termination of exposure (sec.) | | | |
|---|---|---|---|---|---|---|---|---|---|
| | 0 | 5 | 10 | 20 | 30 | 5 | 10 | 20 | 30 |
| Specimen: | | | | | | | | | |
| Glass 1 | 0 | 58 | 91 | 100 | 100 | 75 | 58 | 45 | 39 |
| Glass 2 | 0 | 54 | 88 | 100 | 100 | 54 | 31 | 19 | 12 |
| Glass 3 | 0 | 49 | 79 | 94 | 100 | 77 | 64 | 50 | 42 |

We claim:

1. A phototropic glass which is transparent and which is prompt in its reversibility of coloration and recovery comprising a borate glass body containing therein microcrystals of at least one silver halide selected from the group consisting of silver chloride and silver bromide, and copper oxide, said borate glass body consisting essentially of 30–86 percent by weight of $B_2O_3$, 2–35 percent by weight of $Al_2O_3$ and 12–45 percent by weight of at least one alkaline earth metal oxide selected from the group consisting of CaO, SrO and BaO, each weight percentage being on an analyzed basis, the concentration of said silver halide being at least 0.05 percent by weight, calculated as silver, of said borate glass body, and the concentration of said copper oxide, computed as CuO, being at least 0.005 percent by weight of said borate glass body.

2. The method of producing a phototropic glass which is transparent and which is prompt in its reversibility of coloration and recovery which comprises the steps of melting a batch for a borate glass body consisting essentially of 30–86 percent by weight of $B_2O_3$, 2–35 percent by weight of $Al_2O_3$ and 12–45 percent by weight of at least one alkaline earth metal oxide selected from the group consisting of CaO, SrO and BaO, each weight percentage being on an analyzed basis, said borate glass body containing a constituent of at least one silver halide selected from the group consisting of AgCl and AgBr, and a constituent of copper oxide, respectively in an amount of at least 0.05% by weight of said silver halide, calculated as silver, and at least 0.005% by weight of said copper oxide, computed as CuO, on the basis of said borate glass body, forming and cooling the molten glass, followed by heat treating said glass at a temperature of 550–750° C. for a time sufficient to cause said silver halide to crystallize and thereafter cooling the glass.

3. A phototropic glass in accordance with claim 1 which also contains at least one alkali metal oxide of not more than 25% based on the total weight of the photographic glass.

4. A method in accordance with claim 2 wherein the phototropic glass also contains at least one alkali metal oxide of not more than 25% based on the total weight of the phototropic glass.

References Cited

UNITED STATES PATENTS

| | | | |
|---|---|---|---|
| 3,208,860 | 9/1965 | Armistead | 106—52 |
| 3,419,370 | 12/1968 | Cramer et al. | 106—52 |

HELEN M. McCARTHY, Primary Examiner